United States Patent [19]
Trutna, Jr. et al.

[11] Patent Number: 5,629,126
[45] Date of Patent: May 13, 1997

[54] PHOSPHOR FILM COMPOSITION HAVING SENSITIVITY IN THE RED FOR USE IN IMAGE CAPTURE

[75] Inventors: William R. Trutna, Jr., Atherton; Rene P. Helbing, Palo Alto, both of Calif.

[73] Assignee: Hewlett-Packard Company, Palo Alto, Calif.

[21] Appl. No.: 665,334

[22] Filed: Jun. 17, 1996

[51] Int. Cl.$^6$ .................................... G03C 1/725
[52] U.S. Cl. .................. 430/139; 430/944; 430/503; 428/690; 250/330; 250/475.2; 250/484.2; 250/486.1; 250/484.4; 252/301.4 R; 252/301.4 S
[58] Field of Search ................. 430/139, 495, 430/944; 252/301.4 R, 301.4 S; 250/330, 475.2, 484.2, 486.1, 484.4; 428/690

[56] References Cited

U.S. PATENT DOCUMENTS

| | | | |
|---|---|---|---|
| 3,801,702 | 4/1974 | Donohue | 252/301.4 S |
| 5,065,023 | 11/1991 | Lindmayer | 250/330 |
| 5,208,464 | 5/1993 | O'Conner et al. | 250/493.1 |
| 5,496,597 | 5/1996 | Soininen et al. | 427/584 |

OTHER PUBLICATIONS

Lehmann, Willi; "Activators and Co-Activators in Calcium Sulfide Phosphors" Journal of Luminescence vol. 5, 1972, pp. 87–107.

Hunt, R.W.G., "The Reproduction of Colour", Fifth Addition, Fountain Press, Kingston-upon-Thames, England, 1995, pp. 38–41.

*Primary Examiner*—Lee C. Wright

[57] ABSTRACT

A composition for use in constructing a photosensitive film for recording an image. The composition includes first, second, and third particle types, each the particle type including a crystalline base material having a trap dopant and a color dopant deposited therein. Each of the color dopants has a different spectral sensitivity. One of the particle types is sensitive to light in the red portion of the visible spectrum. This particle type includes a crystalline base material including an alkaline earth sulfide or selenide doped with $Yb^{+2}$.

4 Claims, 2 Drawing Sheets

PHOSPHOR FILM COMPOSITION HAVING SENSITIVITY IN THE RED FOR USE IN IMAGE CAPTURE

FIELD OF THE INVENTION

The present invention relates to photography, and more particularly, to a solid state alternative to photographic film.

BACKGROUND OF THE INVENTION

Conventional photography is based on the exposure of a film coated with a light sensitive emulsion. While this system has been highly refined over the years, it has several problems. First, film based systems are environmentally objectionable. The systems involve noxious chemicals such as silver and chemical developers whose disposal in an environmentally acceptable manner is becoming increasingly more costly.

Second, the film cannot be reused. Most photographers take several pictures for each picture that is actually kept. This leads to large numbers of negatives that are thrown away. In addition to the cost of the unused negatives, this practice further aggravates the above mentioned disposal problems.

Third, film has a finite storage life. This increases the cost of photography by requiring refrigerated storage and/or replacement for film that has passed its usable life.

Fourth, the dynamic range of film is less than adequate for many applications. Even black and white film has a gray scale of only 2.5-3 orders of magnitude. Color film is even more limited. In many applications, the range of intensities that must be recorded greatly exceeds this dynamic range. In such situations, at least some portion of the photograph must be over or under exposed.

Finally, correction of artifacts in photographs is difficult in film based systems. Altering the color of limited regions of a negative is all but impossible. Hence, artifacts such as "red eyes" in portraits taken with flash cameras must be handled by using special camera arrangements or by touching-up the prints. The latter approach requires talents not normally possessed by the average photographer.

These disadvantages together with the increased availability of low-cost computing systems have generated interest in solid state imaging systems such as CCD cameras and the like. Such cameras store their images on computer readable media such as magnetic disks. Since the image is computer readable, the image may be altered with the aid of a conventional computer workstation. Furthermore, these systems are environmentally superior to film in that they do not use noxious chemicals and the storage medium is reusable. Finally, solid state systems can have significantly more dynamic range than conventional film.

Unfortunately, solid state cameras having resolutions equivalent to the resolution available with photographic film are far too expensive for use by the average camera user. These systems are currently priced at 100 times the cost of an inexpensive camera. In addition, the user who is not computer literate has difficulty in having his or her images converted to conventional photographic prints.

Accordingly, there has been some interest in developing an alternative to film. Ideally, this alternative can be used in a conventional camera in place of conventional photographic film. For example, U.S. Pat. No. 5,065,023 to Lindmayer describes a material that utilizes electron trapping to store an image. An image projected on the surface of this material causes electrons to be elevated into the conduction band of the solid state material. The material is doped to have electron traps. The elevated electrons are trapped in spatially nearby traps. The density distribution of the trapped electrons in the material reflects the light intensity distribution of the incident image. This latent image is then read-out electro-optically by scanning the material with an infra-red beam that releases the electrons from the traps and produces visible light when the electrons re-enter their original energy states. The visible light generated by the recombination can be measured and recorded to reveal the original image.

To generate the equivalent of color film, the system taught by Lindmayer utilizes a three layer structure. Each layer consists of a solid state material having two dopants. The first dopant determines the color sensitivity of the layer, i.e., the color of light that will lift an electron into the conduction band of the crystal. The second dopant, which is the same for all layers, determines the energy level of the electron trap. The second dopant determines the wavelength of the light to be used in interrogating the material.

When the three layer structure is scanned with an infra-red beam, each layer emits light of a different color with an intensity that depends on the prior exposure of the film to light in a wavelength range determined by the first dopants. In general, the light emitted on scanning will be at different wavelengths than the incident light to which the first dopants were sensitive; however, a correct color image can be generated from calibration data and a knowledge of the dopants.

The preferred system taught by Lindmayer has several drawbacks. First, the system uses a multi-layer structure. To provide spatial resolution that approximates that of conventional film, the material must be deposited on a non-flat surface. The preferred surface may be viewed as being densely covered with optically isolated "pits" that are filled with the light sensitive material. The width of the pits determines the spatial resolution of the film, since they confines scatter from the light sensitive material to within each pixel. The depth of the pits relates to the quantum efficiency of the film.

There is no practical method for providing a three layer structure in such pits in which the layers are uniform in the amount of material in each layer. If the material quantities are not controlled, color and sensitivity distortions result.

Second, the system taught by Lindmayer requires three deposition steps to generate the three layers. This increases the cost of producing the film.

Lindmayer suggests that a single composition having all three particle types might be possible. In a co-pending patent application U.S. Ser. No. 08/338,922 to Cutler, an improved film composition is described in which the film alternative includes first, second, and third particle types in a common binder material. Each particle type comprises a crystalline base material having a trap dopant and a color dopant deposited therein. Each of the color dopants has a different activation energy for releasing electrons into the conduction/communication band of the crystalline base material.

While this improved composition eliminates the problems associated with the multi-layer structure of Lindmayer, the sensitivity of the color dopants in the red portion of the spectrum is insufficient to provide a film alternative with an acceptable ASA rating. Acceptable color dopants are known for the green and blue wavelengths. These color dopants have broad spectral peaks; hence, in principle, the tail of the green dopant can provide sensitivity in the red. However, the sensitivity provided by this approach is insufficient to provide an acceptable ASA rating for the film alternative.

Broadly, it is the object of the present invention to provide an improved color dopant for use in photographic film alternatives of the type described above.

It is a further object of the present invention to provide a color dopant that has greater sensitivity in the red portion of the spectrum than the dopants discussed for use in film alternatives of the type described above.

These and other objects of the present invention will become apparent to those skilled in the art from the following detailed description of the invention and the accompanying drawings.

SUMMARY OF THE INVENTION

The present invention is a composition for use in constructing a photosensitive film for recording an image. The composition includes first, second, and third particle types, each the particle type including a crystalline base material having a trap dopant and a color dopant deposited therein. Each of the color dopants has a different spectral sensitivity. One of the particle types is sensitive to light in the red portion of the visible spectrum. This particle type includes a crystalline base material including an alkaline earth sulfide or selenide doped with $Yb^{+2}$.

DETAILED DESCRIPTION OF THE INVENTION

The present invention comprises a phosphor for use in construction of a film that may be utilized in a conventional camera as a replacement for conventional color photographic film. As will be explained in more detail below, this replacement film stores an image by trapping electrons. The trapped electrons leave electron vacancies. The trapped electrons may be released by exposing the film to infra-red or visible light. Upon release, the trapped electrons enter a local electron vacancy and generate light of a wavelength determined by the energy level of the vacancy. Assuming that the released electrons return to a site of the same chemical type as that from which the electrons were displaced, the image stored therein may be read-out. The light generated during readout is used to generate a photographic image that may be stored electronically or used to make conventional photographic prints. The readout is accomplished by scanning an exposed film with an infra-red light beam and measuring the light released in response to the light beam.

Figure 1:
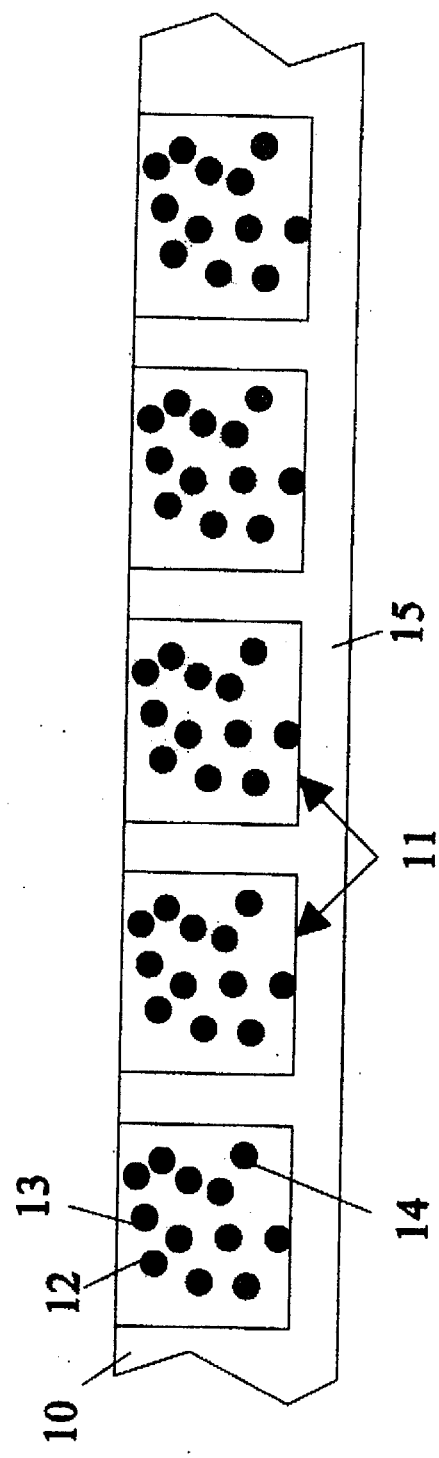
FIG. 1 is a cross-sectional view of a photographic film replacement media 10 utilizing a phosphor composition according to the present invention.

The present invention may be more easily understood with reference to FIG. 1 which is a cross-sectional view of a photographic film replacement media 10 utilizing a phosphor composition according to the present invention. The phosphor is preferably deposited into depressions 11 in a film 15. The phosphor is preferably mixed with an epoxy binder or equivalent material which is then applied to film 15. The phosphor includes three types of particles 12–14. However, the particles may be applied to the pits without a binder. For example, a mixture of the particles may be pressed into the pits and covered with a transparent layer. Each type of particle is a small crystal that is sensitized so as to release electrons into the conduction/communication band in response to exposure to light in a spectral range that specific to that type of particle. To provide color image recording in which the full range of colors is available, at least three different types of particles are needed, with their spectral sensitivities appropriately spaced over the visible wavelength range in a way that allows the color reproduction of the original image.

A backing material having depressions therein is preferred because the depressions prevent light from propagating parallel to the surface of the film. Such propagation during either image exposure or readout reduces the resolution of the film.

Figure 2:
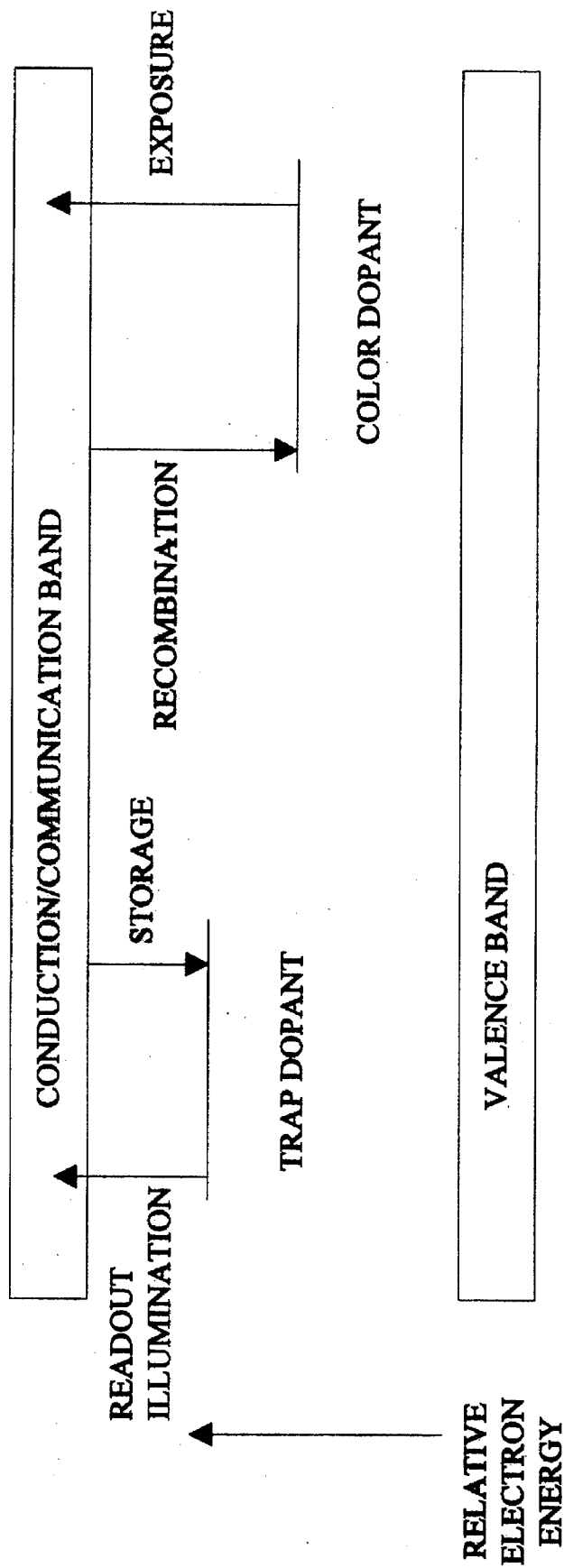
FIG. 2 is an energy level diagram for a phosphor particle according to the present invention.

The various types of phosphor particles are constructed by doping a base material with two dopants. The first dopant determines the sensitivity of the phosphor as a function of the wavelength of the light incident thereon. The second dopant determines the wavelength of the light that is to be used to read-out an image stored in the film. Refer now to FIG. 2 which is an energy level diagram for a phosphor particle according to the present invention. The first dopant will be referred to as the color dopant in the following discussion. Upon exposure to light from an image, electrons are lifted into the conduction band of the crystal and diffuse to a site having the second dopant, referred to as the trap dopant in the following discussion. The sensitivity of the color dopant as function of incident light wavelength is determined by the particular dopant. Dopants that may be utilized to provide sensitivities in a number of wavelength ranges will be discussed in more detail below.

In general, the trap dopants are chosen to have an energy level that is closer to the conduction band than any of the color dopants. Thus, a trap may be readout without exciting any of the color dopant sites. When the trapped electron is released by exposing the particle to light having the appropriate wavelength, the released electron recombines with an electron vacancy at one of the color dopant sites and generates a photon having a wavelength characteristic of the color dopant at that site.

Each particle type is responsible for recording a different color of light. As discussed above, each particle comprises a small crystal of a base material which has been doped with a color dopant and a trap dopant. Exemplary color dopants are Cu, Ag, Mn, O, Pb, Bi, Ce, Eu, Pr, Sm, Tb, Ho, Er, and Tm. Exemplary trap dopants are Sm, Bi, Sn, Fe, V, Ni, Pb, and Ag. Exemplary base materials are MgS, CaS, SrS, BaS, and ZnS and their mixtures such as (Ca, Sr)S. Other dopants and base materials, such as the selenides will be apparent to those skilled in the art. It should be noted that the actual absorption spectrum depends on both the crystalline base material and the color dopant. For example, the absorption spectrum of SrS:Eu is blue-shifted relative to CaS:Eu.

As noted above, dopants for use in the blue and green parts of the spectrum are taught in the above described patents. ZnS doped with Cu as a color dopant and Pb as a trap dopant provides sensitivity to blue light as does: CaS:Cu, SrS:Cu and SrS:Ce. CaS with Mn as the color dopant and Sm as the trap dopant provides sensitivity to green light as does BaS:Cu. Yellow/orange sensitivity is provided by MgS:Eu. Green-blue sensitivity is provided by SrS:Eu, and green-yellow sensitivity is provided by CaS:Eu. The trap dopant is not specified in these examples, since it does not influence the spectral sensitivity. The concentration of the different dopants is optimized to give maximum sensitivity to the incident light and is in the range of 10 to 10,000 parts per million by weight.

As noted above, a storage phosphor with sensitivity in the red has been lacking. The present invention is based on the spectrum of CaS:Yb$^{+2}$. CaS:Yb$^{+2}$ has an excitation spectrum at about 586 nm (2.12 eV), i.e., in the red color range. The sensitivity to red is of the same order of magnitude as the above described dopants exhibit in the blue and green regions of the spectrum; hence, the combination of CaS:Yb$^{+2}$ particles with particles having sensitivity in the blue and green provides a means for overcoming the problems encountered in prior art film alternatives with respect to sensitivity in the red.

CaS is the preferred crystalline base material because of its stability. However, other alkaline earth sulfides or selenides may be used. For example, color particles consisting of MgS:Yb$^{+2}$, BaS:Yb$^{+2}$, RaS:Yb$^{+2}$, and SrS:Yb$^{+2}$ may also be utilized. Similarly color particles based on MgSe, CaSe, SrSe, BaSe, and SnSe may also be utlitized. Methods for generating particles of these types are known to those skilled in the art, and hence, will not be discussed in detail here. The reader is referred to "Preparation of Cathodoluminescence of CaS:Ce and Ca$_{(1-x)}$Sr$_x$SCe" in *J. Electrothem. Soc.:Solid-State Science and Technology*, 130, 432–436, 1983. The preferred particle size is in the 1 to 10 µm range. Care must be taken in following the method described in this article at the reduction stage of the method to be sure that the final particles contain Yb$^{+2}$ and not Yb$^{+3}$. The correct powder has a pale blue, as opposed to a black appearance. This step may be controlled by adjusting the time of the reduction reaction.

A wide variety of trap dopants may be utilized. For example, trap dopants consisting of Vanadium, Samarium, Bismuth, Tin, Iron, Nickel, Lead, or Silver may be used at concentrations from 10 to 10,000 parts per million. As noted above, the choice of the trap dopant depends on wavelength of the light that is to be used to read-out the image.

Various modifications to the present invention will become apparent to those skilled in the art from the foregoing description and accompanying drawings. Accordingly, the present invention is to be limited solely by the scope of the following claims.

What is claimed is:

1. A composition for use in constructing a photosensitive film for recording an image, said composition comprising first, second, and third particle types, each of said particle types comprising a crystalline base material having a trap dopant and a color dopant deposited therein, each of said color dopants having a different spectral sensitivity, wherein one of said particle types is sensitive to light in the red portion of the visible spectrum and comprises a crystalline base material comprising an alkaline earth sulfide or selenide doped with Yb$^{+2}$.

2. The composition of claim 1 wherein at least one of said particle types includes a color dopant chosen from the group consisting of Cu, Ag, Mn, O, Pb, Bi, Ce, Eu, Pr, Sm, Tb, Ho, Er, and Tm.

3. The composition of claim 1 wherein at least one of said trap dopants is chosen from the group consisting of Sm, Bi, Sn, Fe, V, Ni, Pb, and Ag.

4. The composition of claim 1 wherein said base material of said particle type that is sensitive to light in the red portion of the visible spectrum is chosen from the group consisting of MgS, CaS, SrS, BaS, ZnS, MgSe, CaSe, SrSe, BaSe, ZnSe and their mixtures.

* * * * *